(12) United States Patent
Luo et al.

(10) Patent No.: US 12,526,505 B2
(45) Date of Patent: Jan. 13, 2026

(54) REDUCING IMAGING STRAY LIGHT CROSSTALK OF CAMERA UNDER LCD SCREENE

(71) Applicant: HUIZHOU TCL MOBILE COMMUNICATION CO., LTD., Guangdong (CN)

(72) Inventors: Guangyue Luo, Guangdong (CN); Jie Luo, Guangdong (CN); Jun Liu, Guangdong (CN)

(73) Assignee: HUIZHOU TCL MOBILE COMMUNICATION CO., LTD., Guangdong (CN)

( * ) Notice: Subject to any disclaimer, the term of this patent is extended or adjusted under 35 U.S.C. 154(b) by 260 days.

(21) Appl. No.: 18/358,923

(22) Filed: Jul. 25, 2023

(65) Prior Publication Data

US 2023/0421883 A1    Dec. 28, 2023

Related U.S. Application Data

(63) Continuation of application No. PCT/CN2021/076425, filed on Feb. 10, 2021.

(30) Foreign Application Priority Data

Jan. 26, 2021    (CN) .......................... 202110102479.X

(51) Int. Cl.
  *H04N 23/57*    (2023.01)
  *H04N 23/74*    (2023.01)
  *H10K 59/60*    (2023.01)

(52) U.S. Cl.
  CPC ............. *H04N 23/57* (2023.01); *H04N 23/74* (2023.01)

(58) Field of Classification Search
  CPC ................... H04N 23/56; H04N 23/57; G09G 2360/14–148; H10K 59/13; H10K 59/50; H10K 59/60; H10K 59/65
  (Continued)

(56) References Cited

U.S. PATENT DOCUMENTS

2019/0324322 A1 * 10/2019 Zha .................. G02F 1/133606
2021/0072594 A1 *  3/2021 Zhang ............... G02F 1/133603
(Continued)

FOREIGN PATENT DOCUMENTS

| CN | 108810199 A | 11/2018 |
| CN | 109597268 A | 4/2019  |

(Continued)

OTHER PUBLICATIONS

International Search Report in International application No. PCT/CN2021/076425, mailed on Nov. 1, 2021.
(Continued)

*Primary Examiner* — Anthony J Daniels
(74) *Attorney, Agent, or Firm* — PV IP PC; Wei Te Chung

(57) ABSTRACT

The present disclosure provides a method and apparatus for reducing imaging stray light crosstalk of a camera under an LCD screen. The method includes: providing a mini LED lamp ring between backlight modules, where the mini LED lamp ring includes a substrate for the mini LED lamp ring, an LED, and a fluorescent powder stacked sequentially; detecting a state of the camera; and determining the state of the camera, in response to the camera being in an on state, turning off the mini LED lamp ring, and in response to the camera being in an off state, turning on the mini LED lamp ring.

18 Claims, 7 Drawing Sheets

(58) Field of Classification Search
USPC .......................................................... 348/374
See application file for complete search history.

(56) References Cited

U.S. PATENT DOCUMENTS

| | | | | |
|---|---|---|---|---|
| 2021/0333466 A1* | 10/2021 | Zhou | .................... | G02B 6/0055 |
| 2021/0333633 A1* | 10/2021 | Mei | ...................... | G02B 6/0011 |
| 2021/0382226 A1* | 12/2021 | Zha | ...................... | H04M 1/0266 |
| 2021/0405385 A1* | 12/2021 | Zhang | .................. | H10K 59/176 |
| 2022/0117059 A1* | 4/2022 | Hao | ........................ | H05B 45/14 |

FOREIGN PATENT DOCUMENTS

| | | | |
|---|---|---|---|
| CN | 109901327 A | 6/2019 | |
| CN | 110161749 A | 8/2019 | |
| CN | 110441958 A | 11/2019 | |
| CN | 110557477 A | 12/2019 | |
| CN | 110703496 A | 1/2020 | |
| CN | 110850633 A | 2/2020 | |
| CN | 111049973 A | 4/2020 | |
| CN | 111308777 A | 6/2020 | |
| CN | 111624812 A | 9/2020 | |
| KR | 20080041853 A | 5/2008 | |
| WO | 2020232628 A1 | 11/2020 | |

OTHER PUBLICATIONS

Written Opinion of the International Search Authority in International application No. PCT/CN2021/076425, mailed on Nov. 1, 2021.
Chinese Office Action issued in corresponding Chinese Patent Application No. 202110102479.X dated Nov. 8, 2021, pp. 1-7.

* cited by examiner

REDUCING IMAGING STRAY LIGHT CROSSTALK OF CAMERA UNDER LCD SCREEENE

CROSS-REFERENCE TO RELATED APPLICATIONS

This application is a continuation of International Application No. PCT/CN2021/076425, filed on Feb. 10, 2021, which claims priority to and the benefit of Chinese Patent Application No. 202110102479.X, filed on Jan. 26, 2021. The disclosures of the aforementioned applications are incorporated herein by reference in their entireties.

TECHNICAL FIELD

The present disclosure relates to the field of display technologies, and more particularly, to reducing imaging stray light crosstalk of a camera under an LCD screen.

BACKGROUND

With evolution of display technologies and improvement of human aesthetic standards, there is an increasing demand for a front screen-to-body ratio of a mobile phone, which also encourages various manufacturers to devise various ways to increase the screen-to-body ratio, such as telescopic cameras, digging of a hole in the screen, flipping of a back camera, and the like. A hole-digging screen may be designed to place a camera digging hole under the screen, so that the design of the mobile phone may be greatly improved in terms of a face value, but the function of the camera may be greatly affected. Meanwhile, there are different methods for forming the hole-digging screen. Huawei's method is to place the camera under two layers of screen and Samsung's method is to only place the camera under a glass substrate. Therefore, the hole-digging screen cannot avoid such a problem that the more the camera moves downward, the worse an effect of the function of the camera will be, but an aesthetic level will be improved. However, when the camera is placed under the screen, the effect is certainly not as good as before because the camera is always separated from the light by the glass substrate regardless of transmission of the light. Second, even if the camera is placed in a manner of digging the hole in the screen, it cannot hide the camera very well. The camera may also add a black edge into the screen, which, in general, will be very obtrusive on the screen and will not achieve a desired effect as imagined. A reversible camera may be very unadvisable for the user to frequently flip the camera, because a connection line within the mobile phone may be pulled at the same time of flipping of the camera, resulting in disconnection of the line. Elevating of the camera, when raised, sacrifice the screen-to-body ratio.

The camera under the LCD screen may cause a problem such as imaging blurring due to backlight leakage into a light guide component.

SUMMARY

In one aspect, the present disclosure discloses a method for reducing imaging stray light crosstalk of a camera under a liquid crystal display (LCD) screen, including: providing a mini light-emitting diode (Mini LED) lamp ring between backlight modules, where the mini LED lamp ring includes a substrate for the mini LED lamp ring, a light-emitting diode (LED), and a fluorescent powder stacked sequentially; detecting a state of the camera; and determining the state of the camera, in response to the camera being in an on state, turning off the mini LED lamp ring, and in response to the camera being in an off state, turning on the mini LED lamp ring.

In another aspect, the present disclosure discloses a method for reducing imaging stray light crosstalk of a camera under a liquid crystal display (LCD) screen, including: providing a mini light-emitting diode (Mini LED) lamp ring between backlight modules; detecting a status of the camera; and controlling a state of the mini LED lamp ring according to the state of the camera.

In yet another aspect, the present disclosure further provides an apparatus for reducing imaging stray light crosstalk of a camera under a liquid crystal display (LCD) screen, including at least one processor; and a memory in communication with the at least one processor; where the memory stores instructions executable by the at least one processor that are configured to perform the above-described method of reducing imaging stray light crosstalk of a camera under an LCD screen.

BRIEF DESCRIPTION OF THE DRAWINGS

In order to more clearly illustrate the technical solutions in embodiments of the present disclosure, the accompanying drawings depicted in the description of the embodiments will be briefly described below. It will be apparent that the accompanying drawings in the following description are merely some embodiments of the present disclosure, and other drawings may be obtained from these drawings without creative effort by those skilled in the art.

Figure 1:
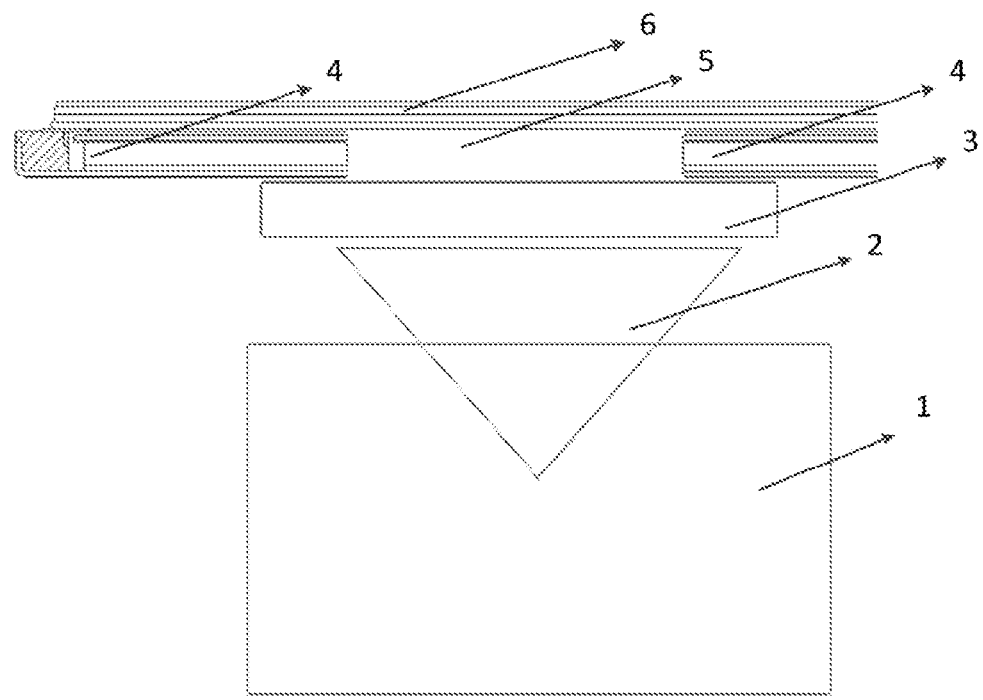
FIG. 1 is a schematic diagram of a mounting structure of a camera under an LCD screen in the related art.

The implementation, functional features and advantages of the objects of the present disclosure will be further described with reference to the embodiments and the accompanying drawings.

DETAILED DESCRIPTION

Technical solutions in embodiments of the present disclosure will be clearly and completely described below in conjunction with drawings in the embodiments of the present disclosure. Obviously, the described embodiments are only a part of embodiments of the present disclosure, rather than all the embodiments. Based on the embodiments in the present disclosure, all other embodiments obtained by those skilled in the art without creative work fall within the protection scope of the present disclosure.

It should be noted that all directional indications (such as up, down, left, right, front, back, etc.) in the embodiments of the present disclosure are only intended to explain a relative positional relationship, a motion situation, and the like between components in a particular pose (as shown in the drawings), and if the particular pose changes, the directional indication changes accordingly.

In addition, if terms "first", "second" or the like are involved in the embodiments of the present disclosure, the terms are for illustrative purposes only and are not to be construed as indicating or imposing a relative importance or implicitly indicating the number of technical features indicated. Thus, a feature that limited by "first", "second" may expressly or implicitly include at least one of the features. In addition, the technical solutions of the various embodiments may be combined with each other, but the combination of the technical solutions must be realized by a person of ordinary skill in the art. When the combination of the technical solutions is inconsistent with each other or cannot be realized, the combination of the technical solutions should be considered not to exist or fall within the protection scope of the present disclosure.

The present disclosure provides a method for reducing imaging stray light crosstalk of a camera under an LCD screen, which can be applied in electronic devices such as photographing and camera shooting devices.

Figure 2:
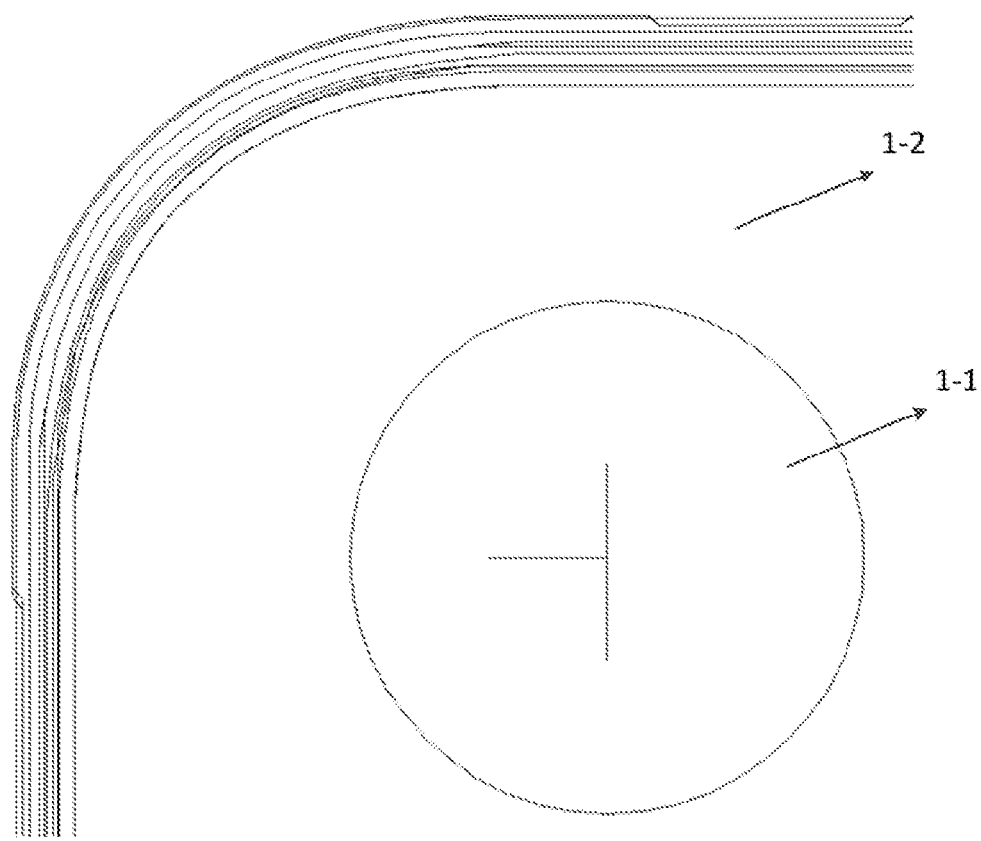
FIG. 2 is a schematic diagram of a dividing structure for a backlight region formed in the camera in FIG. 1.

FIG. 1 is a schematic diagram of a mounting structure of a camera under an LCD screen in the related art. FIG. 2 is a schematic diagram of a dividing structure for a backlight region formed in the camera in FIG. 1. The principle of fog transmission is that, when a visible light passes through the smoke or fog in the air, it is blocked and reflected, and cannot pass therethrough, so that the human eye receiving only the visible light cannot see an object behind the smoke or fog. Since the near-infrared light may have a longer wavelength, it may pass through the smoke and fog. The near-infrared light can be sensed by a photosensitive element of an electronic device having a photographing function such as a camera or a mobile phone, so it is possible to monitor an object behind the smoke the fog by pass through the smoke and fog with the near-infrared light. In the range of invisible light, an infrared light having a certain frequency can pass through the fog. However, since the wavelength of the infrared light is different from that of visible light, it is necessary to process the infrared light on an electronic device and a lens having a photographing function, such as a camera or a mobile phone, so as to achieve the purpose of focusing the infrared light. Meanwhile, it is also necessary to redesign the infrared light on the electronic device, so as to image an object with the invisible light having the frequency. Since the invisible light has no corresponding visible light color map, an image presented on the monitor is black and white in color. Shooting an object through cloud fog and water gas may be equivalent to passing through a double lens (a water bead and an actual lens). Except a R ray in RGB rays that can be correctly focused on a CCD imaging surface, a G ray and a B ray in the RGB rays cannot be normally projected on the CCD imaging surface. As a result, an image of an object in the case of the cloud fog and water gas cannot be normally and clearly obtained by an ordinary mode lens. Passing through the fog can also refer to, for example, passing through smoke, water vapor, or fine obstacles (such as slight dirt and rain water from the transparent cover), and the like in a practical application. The image quality taken by an ordinary camera in these harsh environments may be greatly degraded or even an image of a monitoring target may not be acquired. An electronic device may have a photographing function, such as a camera or a mobile phone for passing through the fog, are often competent in these situations. As shown in FIGS. 1 and 2, compatibility of the display and photographing functions can be achieved by switching of a state for passing through the fog. However, since there need to be no black edge in the display area, a backlight cross-section of a backlight hole-opening region cannot be shielded by the light shielding material. Therefore, the backlight cross-section such as a lens may have a strong light leakage string, resulting in a poor imaging effect.

A First Embodiment

Figure 3:
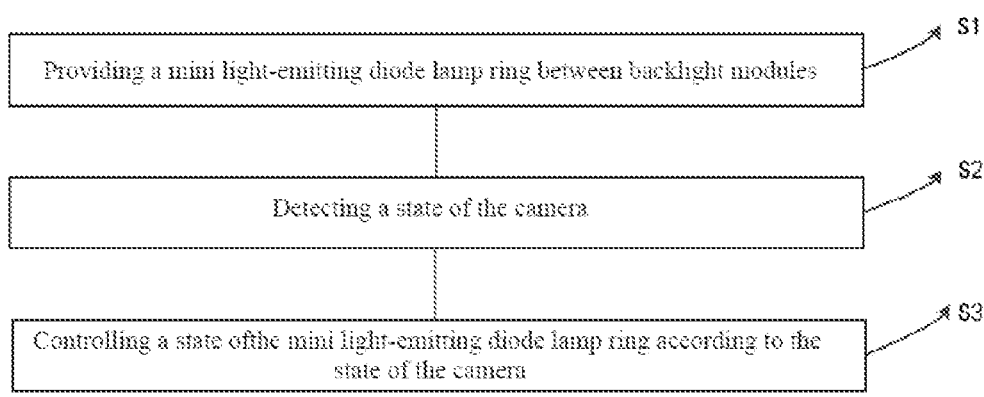
FIG. 3 is a flowchart of a method for reducing imaging stray light crosstalk of a camera under an LCD screen according an embodiment of the present disclosure.
Figure 4:
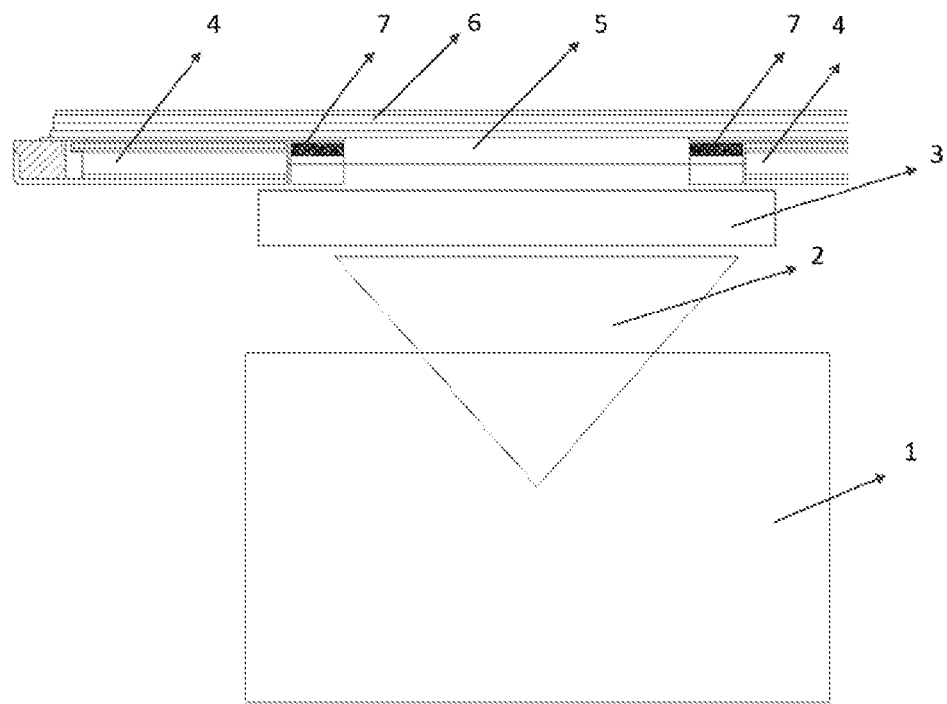
FIG. 4 is a schematic diagram of a mounting structure of a camera under an LCD screen used in FIG. 3.
Figure 5:
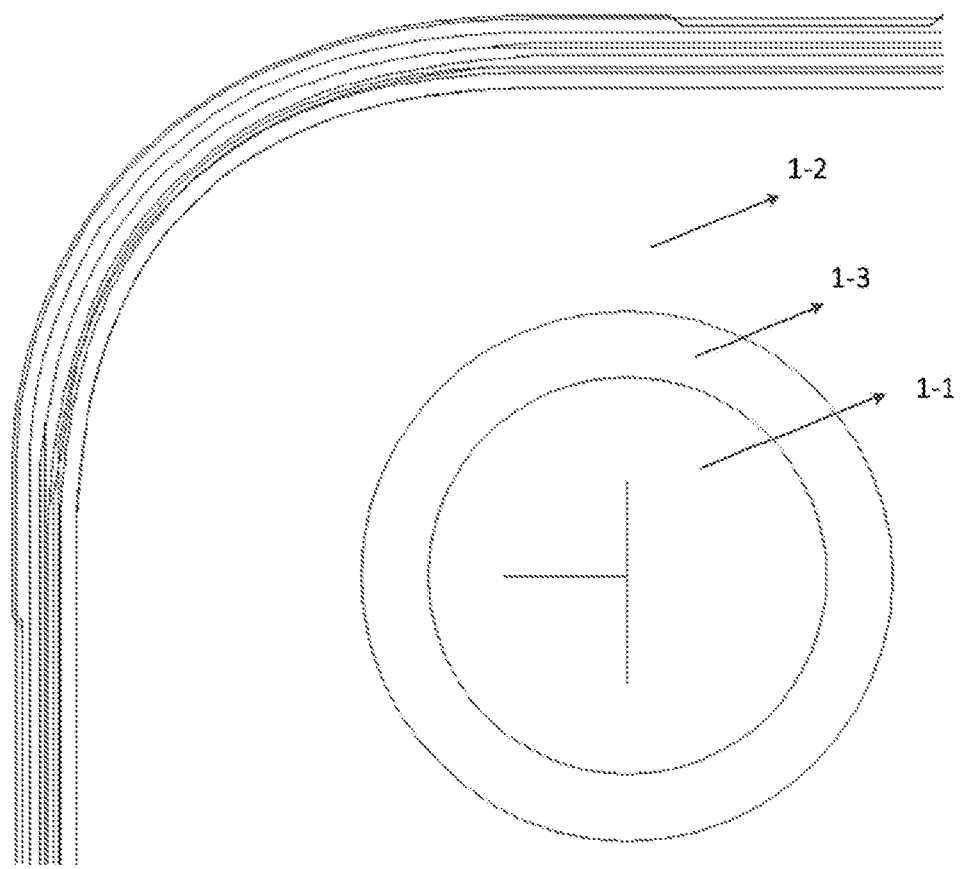
FIG. 5 is a schematic diagram of a dividing structure for a backlight region formed in the camera in FIG. 4.
Figure 6:
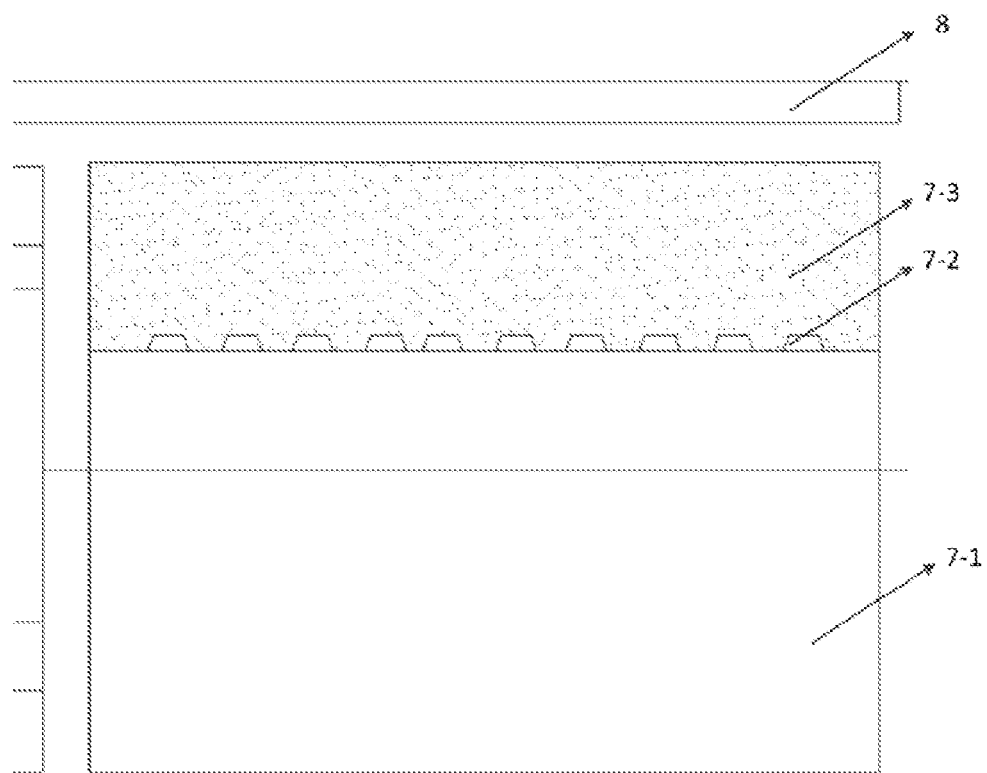
FIG. 6 is a schematic diagram showing the structure of a mini LED lamp ring of FIG. 3.
Figure 7:
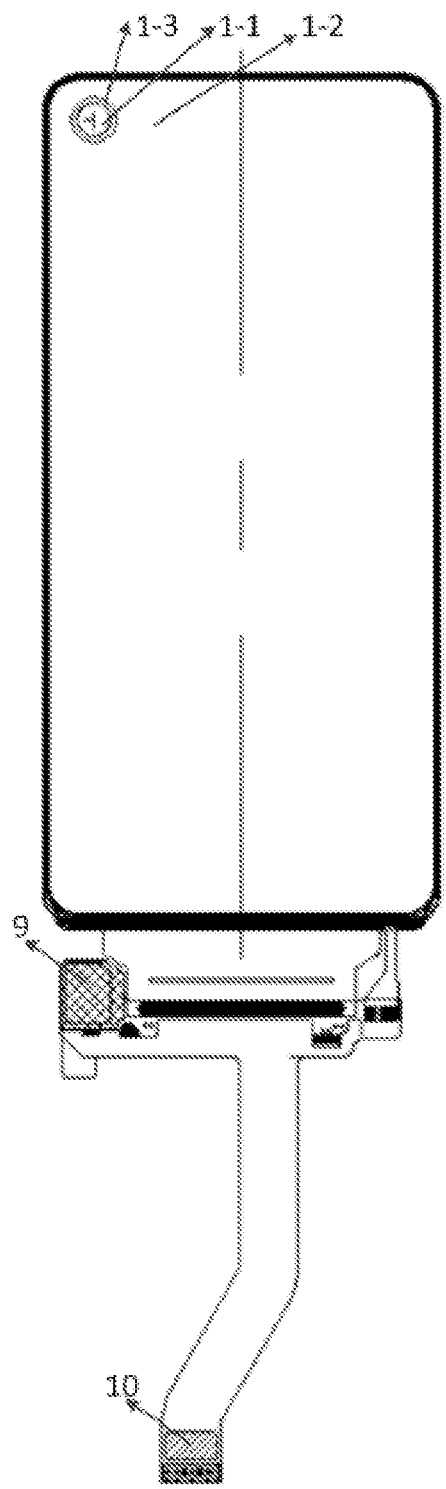
FIG. 7 is a schematic diagram showing the structure of a display module used in FIG. 3.

FIG. 3 is a flowchart of a method for reducing imaging stray light crosstalk of a camera under an LCD screen according an embodiment of the present disclosure. FIG. 4 is a schematic diagram of a mounting structure of a camera under an LCD screen used in FIG. 3. FIG. 5 is a schematic diagram of a dividing structure for a backlight region formed in the camera in FIG. 4. FIG. 6 is a schematic diagram showing the structure of a mini LED lamp ring of FIG. 3. FIG. 7 is a schematic diagram showing the structure of a display module used in FIG. 3. As shown in FIGS. 3-6, a method for reducing imaging stray light crosstalk of a camera under an LCD screen may be provided, including at least steps S1-S3.

At step S1, a mini LED lamp ring 7 may be provided between backlight modules 4.

The mini LED lamp ring may include a substrate 7-1 for the mini LED lamp ring, an LED 7-2, and a fluorescent powder 7-3 stacked sequentially.

The substrate 7-1 may include a printed circuit board (PCB) and an LED chip.

The fluorescent powder 7-3 may have a wavelength in the range of 430 nm to 680 nm. A fluorescent powder of a conventional white LED may be generally used.

An inner diameter of the mini LED lamp ring 7 may be determined by a Field of View (FOV) of the lens. Currently, the inner diameter of the mini LED lamp ring 7 may be generally 2 mm to 20 mm. In some implementations, the mini LED lamp ring 7 may have a width larger than 15 mm. In the present embodiment, the inner diameter of the mini LED lamp ring 7 may be set to 6 mm, and an outer diameter of the mini LED lamp ring 7 may be set to 26 mm. Herein, the mini LED lamp ring may have a width of 20 mm. In an optical instrument, the FOV may refer to an included angle formed by taking a lens of the optical instrument as an apex and passing an object image of a target to be measured through two edges of a maximum range of the lens. The magnitude of the FOV may determine a range of a view of the optical instrument. The larger the field of view, the larger the view, and the smaller the optical power. In general, the target object may be not trapped in the lens beyond the FOV. The FOV may be divided into an object FOV and an Image FOV Typically, a user for the optical instrument may be concerned with the object FOV For most optical instruments, measurement of the FOV may be based on a diameter of the imaging object, for example, a telescope, a microscope, and the like. For an optical device such as a camera and a video camera, since a photosensitive surface thereof is rectangular, the FOV may be generally calculated based on a diagonal of the rectangular photosensitive surface as the diameter of the imaging object. Since the FOV of the lens are of different sizes, the inner diameter of the mini LED lamp ring 7 determined thereby is also of different sizes. The size of the inner diameter of the mini LED lamp ring 7 may be selected according to actual requirements, and the inner diameter of the mini LED lamp ring 7 may be set according to actual display angle requirements, which is not limited to the present disclosure.

FIG. 7 is a schematic diagram of the structure of the display module used in FIG. 3. As shown in FIG. 7, after the mini LED lamp ring 7 is provided between the backlight modules, a hole-area backlight region 1-1, a conventional backlight region 1-2, and a mini LED annular backlight region 1-3 may be generated. Since there is a gap between different light-emitting regions, it is necessary to add a diffusion film 8 over the mini LED lamp ring 7 and the conventional backlight region to atomize the light as much as possible, thereby shielding the gap between the mini LED lamp ring 7 and the conventional backlight region so that the front display cannot be perceptible.

The camera 1 may be provided with a lens 2 for photographing or video recording. An electrochromic glass 3 may be provided in front of the lens 2. The camera 1 may be further provided with a backlight module 4. The backlight can also be displayed to the bending region 10 through circuit arrangement of a component region 9. The backlight module may one of the key components of the LCD screen. A function of the backlight module is to supply a light source with sufficient and uniform distribution of the brightness so that the LCD screen can display an image normally. The LCD screen itself does not emit light, and it displays graphics or characters as a result of its modulation of light. The LCD screen is a non-luminous display device, and the display function can be achieved by means of a backlight source. The performance of the backlight source may directly affect the displayed image quality of the LCD. A cost of the backlight source accounts for 30-50% of the LCD, and the consumed power accounts for 75% of the LCD. Therefore, the backlight source can be said to be an important component in the LCD. The backlight source is a light source that provides the LCD screen with light. The backlight source may be mainly composed of a light source, a light guide plate, an optical diaphragm, a plastic frame, and the like. The backlight source may have the characteristics of high brightness, long life, uniform luminescence, and the like. Currently, there are three types of backlight sources, namely, Electroluminescent (EL), Cold Cathode Fluorescent Lamp (CCFL), and LED, which are classified into a side-light type and a direct-light type (a bottom backlight type) depending on the distribution position of the light source. As the LCD continues to be developed in a brighter, lighter, and thinner direction, the side-light type CCFL-type backlight source becomes the mainstream of developing the backlight source. The backlight source for the liquid crystal display may be constituted of a light source, a light guide plate, a reflective sheet, and an optical film sheet. When a light ray emitted from backlight source is illuminated to a liquid crystal panel, the light ray may be first transmitted upward through the lower polarizing plate, and the lower polarizing plate may change the polarization direction of the light ray according to its own mechanism. The light ray may then touch the color filter to produce a color and finally be incident on the upper polarizing plate. After a polarization direction of the light ray may be changed by a liquid crystal, a portion of the light ray can be emitted and another portion of the light ray can be absorbed. Each of pixels on the entire liquid crystal panel can separately determine an intensity of the emitted light ray. As such, an image may be generated.

At step S2, a state of the camera may be detected.

The user needs to call the camera first to obtain a state of the camera and determine whether the current camera can be used. For example, following codes may be used to obtain a current state of the camera in an android system.

```
public static boolean isCameraCanUse( ) {
    boolean canUse = true;
    Camera mCamera = null;
    try {
        mCamera = Camera.open( );
    } catch (Exceptione) {
        canUse = false;
    }
    if(mCamera == null){
        canUse = false;
    }
    if (canUse) {
        mCamera.release( );
        mCamera = null;
    }
    return canUse;
}
```

At step S3, a state of the mini LED lamp ring 7 may be controlled according to the state of the camera.

The state of the camera may be determined. If the camera may be in an on state, the mini LED lamp ring may be turned off. If the camera may be in an off state, the mini LED lamp ring 7 may be turned on. The mini LED lamp ring 7 may be formed by splicing together a plurality of LEDs. The plurality of LEDs may be spliced in such a manner that a portion of the LEDs are connected in series and then connected in series with the remaining LEDs, or a portion of the LEDs are connected in parallel and then connected in series with the remaining LEDs. Since the size of the mini LED lamp ring 7 can be set according to an actual situation, the number of selected LEDs is also variable. The connection of the plurality of LEDs can be flexibly set according to actual requirements. The state of the mini LED lamp ring 7 may be controlled in such a manner that a plurality of LEDs are first connected in series and then connected in parallel or first connected in parallel and then connected in series, so that efficiency can be improved.

By modifying the conventional backlight structure, the mini LED annular backlight may be introduced. When the display is displayed normally, the mini LED lamp ring is turned on to form an annular backlight. A display effect of the display is consistent with that of the conventional solution. When the mini LED lamp ring is turned off during photographing/shooting, the annular backlight is turned off. The purpose of blocking stray light can be achieved by shielding of the annular backlight. A lateral stray light of the conventional backlight is blocked from being out of the visible range of the camera by controlling the mini LED lamp ring to be extinguished at the time of photographing.

A Second Embodiment

Figure 8:
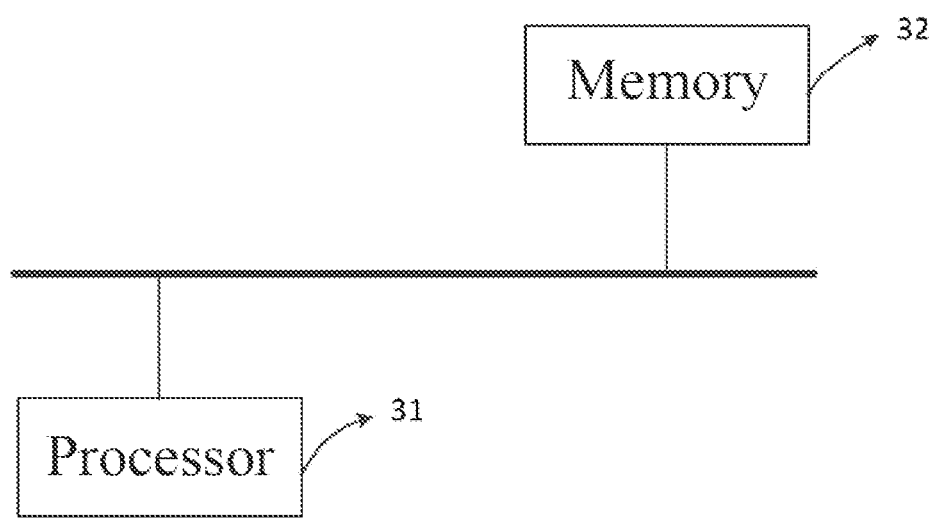
FIG. 8 is a schematic diagram showing the structure of an apparatus for reducing imaging stray light crosstalk of a camera under an LCD screen according to an embodiment of the present disclosure.

FIG. 8 is a schematic diagram showing the structure of an apparatus for reducing imaging stray light crosstalk of a camera under an LCD screen according to an embodiment of the present disclosure. The apparatus for reducing imaging stray light crosstalk of the camera under the LCD screen according to the present embodiment may include one or more processors 31 and a memory 32. In FIG. 8, a processor 31 may be used as an example.

The processor 31 and the memory 32 may be connected by a bus or otherwise. An example that the processor 31 and the memory 32 may be connected by a bus may be taken in FIG. 8.

The memory 32, as a non-volatile computer-readable storage medium for reducing the imaging stray light crosstalk of the camera under the LCD screen, can be used to store a non-volatile software program, a non-volatile computer-executable program and module, such as the method for reducing the imaging stray light crosstalk of the camera under the LCD screen in the first Embodiment, and instructions corresponding to the method. The processor 31 executes the functional applications and the data processing for the method for reducing the imaging stray light crosstalk of the camera under the LCD screen, i.e. implements the method for reducing the imaging stray light crosstalk of the camera under the LCD screen in the first embodiment described above, by running software programs, instructions or modules stored in the memory 32.

In addition, the memory 32 may include a high speed random access memory, and may also include a non-volatile memory, such as at least one magnetic disk storage device, a flash memory device, or other non-volatile solid state storage device. In some embodiments, the memory 32 can further include a remote memory disposed corresponding to the processor 31. The remote memory can be connected to the processor 31 via a network. Examples of the network include but are not limited to an internet, an intranet, a local area network, a mobile communication network and the combinations of them. The method for reducing the imaging stray light crosstalk of the camera under the LCD screen is described herein with reference to FIGS. 1 to 7 and content related thereto, and details thereof are not repeatedly described herein.

It should be noted that, since the above-mentioned information exchange and execution process between the modules and units in the above-mentioned apparatus and system are based on the same concept as the processing method embodiment of the present disclosure, details thereof may refer to the description in the method embodiment of the present disclosure, which are not repeatedly described herein again.

Unlike the related art, the method and apparatus for reducing imaging stray light crosstalk of the camera under the LCD screen of the present disclosure may provide the mini LED ring between the backlight modules, detect a state of the camera, and control turning on or off of the mini LED lamp ring according to the state of the camera. The backlight structure of a hole area of the camera under the LCD screen may be adjusted on the basis of the existing design to filter the stray light at a low cost, so that a photographing and imaging effect is better, and the use satisfaction of the user is improved.

It should be understood by those of ordinary skilling in the art that all or a portion of the steps of the various methods of the embodiments may be performed by a program that may be stored in a computer readable storage medium including: Read only memory (ROM), Random Access Memory (RAM), magnetic or optical disk, and the like.

The above is merely preferred embodiments of the present disclosure and is not intended to limit the scope of the present disclosure. The equivalent structures or equivalent processes made based on the application concept of the present disclosure by the description and drawings of the present disclosure or the description and drawings of the present disclosure utilized directly or indirectly in other related fields of technology should be similarly included within the scope of the present disclosure.

What is claimed is:

1. A method for reducing imaging stray light crosstalk of a camera under a liquid crystal display (LCD) screen, comprising:
   providing a mini light-emitting diode (Mini LED) lamp ring between backlight modules, wherein the mini LED lamp ring comprises a substrate for the mini LED lamp ring, a light-emitting diode (LED), and a fluorescent powder stacked sequentially;
   detecting a state of the camera; and
   in response to the camera being in an on state, turning off the mini LED lamp ring, and in response to the camera being in an off state, turning on the mini LED lamp ring;
   wherein the mini LED lamp ring has a width greater than 15 mm.

2. The method of claim 1, wherein a diffusion film is disposed above the mini LED lamp ring.

3. The method of claim 1, wherein the substrate comprises a printed circuit board (PCB) substrate and an LED chip.

4. The method of claim 1, wherein the fluorescent powder has a wavelength in the range of 430 nm to 680 nm.

5. The method of claim 1, wherein the mini LED lamp ring has an inner diameter of 2 mm to 20 mm.

6. The method of claim 1, wherein the mini LED lamp ring has a width greater than 18 mm.

7. The method of claim 5, wherein the mini LED lamp ring has an inner diameter of 20 mm.

8. The method of claim 1, wherein the mini LED lamp ring comprises a plurality of LEDs, and the state of the mini LED lamp ring is controlled in such a manner that a portion of the LEDs are connected in series and then connected in parallel with the remaining LEDs.

9. The method of claim 1, wherein the mini LED lamp ring comprises a plurality of LEDs, and the state of the mini LED lamp ring is controlled in such a manner that a portion of the LEDs are connected in parallel and then connected in series with the remaining LEDs.

10. A method for reducing imaging stray light crosstalk of a camera under a liquid crystal display (LCD) screen, comprising:
    providing a mini light-emitting diode (Mini LED) lamp ring between backlight modules;
    detecting a state of the camera; and
    controlling a state of the mini LED lamp ring based on the state of the camera;
    wherein the mini LED lamp ring has a width greater than 15 mm.

11. The method of claim 10, wherein the mini LED lamp ring comprises a substrate for the mini LED lamp ring, a light-emitting diode (LED), and a fluorescent powder stacked sequentially.

12. The method of claim 10, wherein the controlling the state of the mini LED lamp ring based on the state of the camera comprises:
    in response to the camera being in an on state, turning off the mini LED lamp ring, and in response to the camera being in an off state, turning on the mini LED lamp ring.

13. The method of claim 11, wherein a diffusion film is disposed above the mini LED lamp ring.

14. The method of claim 11, wherein the substrate comprises a printed circuit board (PCB) substrate and an LED chip.

15. The method of claim 11, wherein the fluorescent powder has a wavelength in the range of 430 nm to 680 nm.

16. The method of claim 10, wherein the controlling the state of the mini LED lamp ring based on the state of the camera comprises:

in the case that the mini LED lamp ring comprises a plurality of LEDs, controlling the state of the mini LED lamp ring in such a manner that a portion of the LEDs are connected in parallel and then connected in series with the remaining LEDs or in such a manner that a portion of the LEDs are connected in parallel and then connected in series with the remaining LEDs.

17. The method of claim 10, wherein the mini LED lamp ring has an inner diameter of 2 mm to 20 mm.

18. An apparatus for reducing imaging stray light crosstalk of a camera under a liquid crystal display (LCD) screen, comprising at least one processor; and a memory in communication with the at least one processor; wherein the memory stores instructions executable by the at least one processor that are configured to perform a method for reducing imaging stray light crosstalk of a camera under a liquid crystal display (LCD) screen, comprising: providing a mini light-emitting diode (Mini LED) lamp ring between backlight modules; detecting a state of the camera; and controlling a state of the mini LED lamp ring based on the state of the camera;

wherein the mini LED lamp ring has a width greater than 15 mm.

* * * * *